US008707556B2

(12) United States Patent
Imam et al.

(10) Patent No.: US 8,707,556 B2
(45) Date of Patent: Apr. 29, 2014

(54) INJECTOR NOZZLE SLEEVE REPLACER AND METHOD

(75) Inventors: Syed Imam, Windsor (CA); Rick Martin, Clinton Township, MI (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 130 days.

(21) Appl. No.: 13/211,876

(22) Filed: Aug. 17, 2011

(65) Prior Publication Data

US 2013/0042473 A1 Feb. 21, 2013

(51) Int. Cl.
*B23P 17/00* (2006.01)

(52) U.S. Cl.
USPC .................... 29/888.46; 29/888.4; 29/888.41; 29/888.45; 123/470

(58) Field of Classification Search
USPC ......... 29/888.4, 888.41, 888.45, 888.46, 235, 29/237, 238, 255, 270, 278; 123/470
See application file for complete search history.

(56) References Cited

U.S. PATENT DOCUMENTS

| | | | | | |
|---|---|---|---|---|---|
| 2,264,914 | A | * | 12/1941 | L'Orange | 239/132.5 |
| 4,790,055 | A | * | 12/1988 | Raufeisen et al. | 29/888.46 |
| 4,938,193 | A | * | 7/1990 | Raufeisen et al. | 123/470 |
| 5,020,203 | A | * | 6/1991 | Rix | 29/255 |
| 5,566,658 | A | * | 10/1996 | Edwards et al. | 123/470 |
| 5,960,774 | A | * | 10/1999 | Norgauer et al. | 123/470 |
| 6,745,752 | B1 | * | 6/2004 | Jensen et al. | 123/470 |
| 6,769,409 | B2 | * | 8/2004 | Evancik et al. | 123/470 |
| 6,863,053 | B2 | * | 3/2005 | Suzuki et al. | 123/470 |
| 2011/0061217 | A1 | | 3/2011 | Shevela et al. | |

* cited by examiner

*Primary Examiner* — Richard Chang
(74) *Attorney, Agent, or Firm* — Baker & Hostetler LLP

(57) ABSTRACT

An injection nozzle sleeve servicing system is provided. The system includes: a guide having two ends and an interior chamber, the guided having threads on one end; an installer screw dimensioned to fit inside the interior chamber, the installer screw having a threaded end and a pushing end; an external nut having two sets of threads wherein each of the two sets of threads on the external nut are threaded in different directions wherein one of the sets of threads on the external nut is configured to communicate with the threads on the guide and the other set of threads on the external nut is configured to communicate with the threads on the installer screw; and a rotational lock in the guide configured to prevent the installer screw from rotating with respect to the guide, wherein when one set of threads on the external nut is engaged with the threads on the guide and the other set of threads on the external nut is engaged with the threads on the installer screw, and the external nut is turned with respect to the guide and the installer screw to cause relative axial movement between the external nut and the guide, the installer screw moves axially with respect to the guide at a different rate than the axial movement of the external nut and the guide. A method for installing a fuel injector nozzle sleeve may also be provided.

16 Claims, 4 Drawing Sheets

INJECTOR NOZZLE SLEEVE REPLACER AND METHOD

FIELD OF THE INVENTION

The present invention relates generally to a system for installing and removing injector nozzle sleeves. More particularly, the present invention relates to a system for installing and removing injector nozzle sleeves in reciprocating piston engine blocks.

BACKGROUND OF THE INVENTION

In reciprocating engines such as diesel engines, the injector nozzle sleeve may need to be replaced from time to time. Typically, this is done by pulling the injector nozzle sleeve with a tool and then replacing a new injector nozzle sleeve into a hole in the engine block.

An example of this tool is described in pending U.S. patent application Ser. No. 12/837,678 titled "Injector Sleeve Removal Device and Method of Use" filed Jul. 16, 2010 and invented by Michael Shevela and Edward Magana incorporated herein by reference in its entirety. The new injector nozzle sleeve is then pounded into the hole with a hammer to give the sleeve a press fit. Often the cylinder head must be removed from the engine block in order to avoid being damaged by the hammering.

While this system does work, it would be desirable to devise a tool or system that can install a new fuel injector nozzle sleeve without requiring the head to be removed. Furthermore, it would be desirable to have a tool that can replace the injector nozzle sleeve in a manner that exerts less force on the injector nozzle sleeve than hammering in order to avoid damaging or bending the injector nozzle sleeve out of shape.

SUMMARY OF THE INVENTION

It is desirable to have a system or tool that can be used to provide maintenance on an injector nozzle sleeve by either removing and/or replacing the injector nozzle sleeve without requiring the cylinder head to removed without requiring a hammer to pound the injector nozzle sleeve into place.

In accordance with one embodiment of the present invention, An injection nozzle sleeve servicing system is provided. The system includes: a guide having two ends and an interior chamber, the guided having threads on one end; an installer screw dimensioned to fit inside the interior chamber, the installer screw having a threaded end and a pushing end; an external nut having two sets of threads wherein each of the two sets of threads on the external nut are threaded in different directions wherein one of the sets of threads on the external nut is configured to communicate with the threads on the guide and the other set of threads on the external nut is configured to communicate with the threads on the installer screw; and a rotational lock in the guide configured to prevent the installer screw from rotating with respect to the guide, wherein when one set of threads on the external nut is engaged with the threads on the guide and the other set of threads on the external nut is engaged with the threads on the installer screw, and the external nut is turned with respect to the guide and the installer screw to cause relative axial movement between the external nut and the guide, the installer screw moves axially with respect to the guide at a different rate than the axial movement of the external nut and the guide.

In accordance with another embodiment of the present invention, a method for installing a fuel injector nozzle sleeve is provided. The method includes fitting a fuel injector nozzle sleeve to be installed on an end of a guide; fitting the sleeve and guide in a hole in an engine block; clamping the guide to the engine block; turning an external nut with respect to the guide via threads on the external nut and guide; extending installer screw axially through the guide when the external nut is turned with respect to the guide at a different rate than the axial movement between the external nut and the guide.

In accordance with yet another embodiment of the present invention, an injection nozzle sleeve servicing system is provided. The system includes a means for guiding having two ends and an interior chamber, the guiding means having threads on one end; a means for pushing dimensioned to fit inside the interior chamber, the means for pushing having a threaded end and a pushing end; an external nut having two sets of threads wherein each of the two sets of threads on the external nut are threaded in different directions wherein one of the sets of threads on the external nut is configured to communicate with the threads on the guiding mean and the other set of threads on the external nut is configured to communicate with the threads on the means for pushing and a means for rotational locking in the guiding means configured to prevent the means for pushing from rotating with respect to the guiding means, wherein when one set of threads on the external nut is engaged with the threads on the guiding means and the other set of threads on the external nut is engaged with the threads on the means for pushing, and the external nut is turned with respect to the guiding means and the means for pushing to cause relative axial movement between the external nut and the guiding means, the means for pushing moves axially with respect to the guiding means at a different rate than the axial movement of the external nut and the guiding means.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
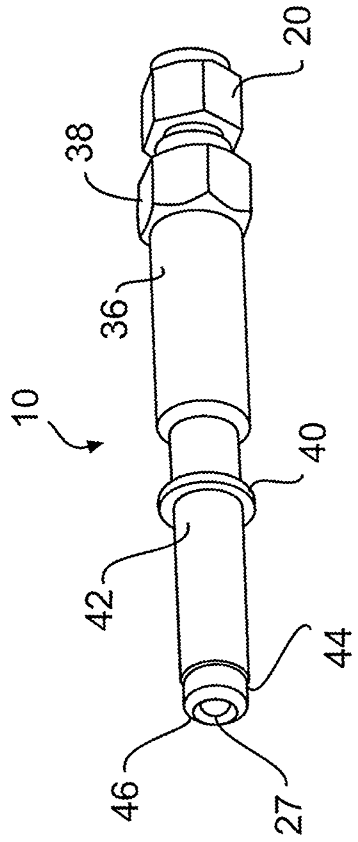
FIG. 1 is a perspective view of an injector nozzle sleeve replacer in accordance with the embodiment of the invention.

The invention will now be described with reference to the drawing figures, in which like reference numerals refer to like parts throughout. An embodiment in accordance with the present invention provides a system for removing and replacing fuel injector nozzle sleeves used in internal combustion engines.

Figure 2:
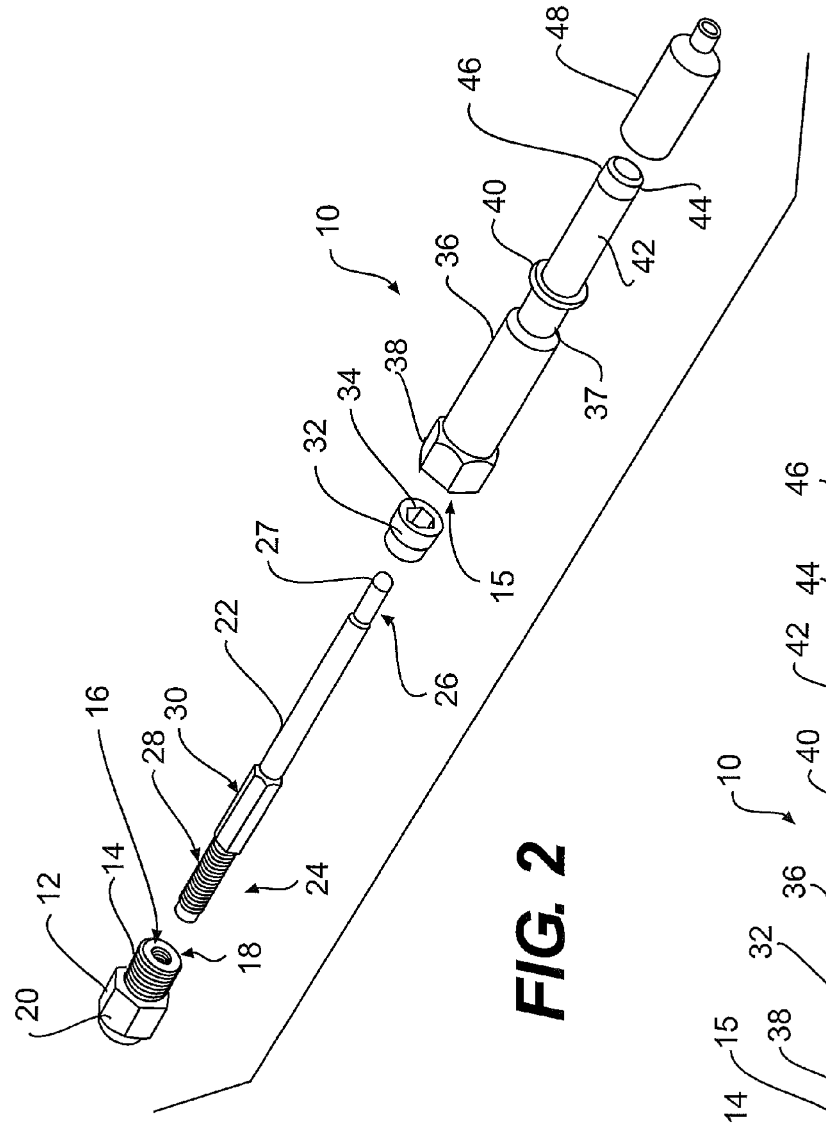
FIG. 2 is an exploded view of the injector nozzle sleeve replacer shown in FIG. 1.
Figure 3:
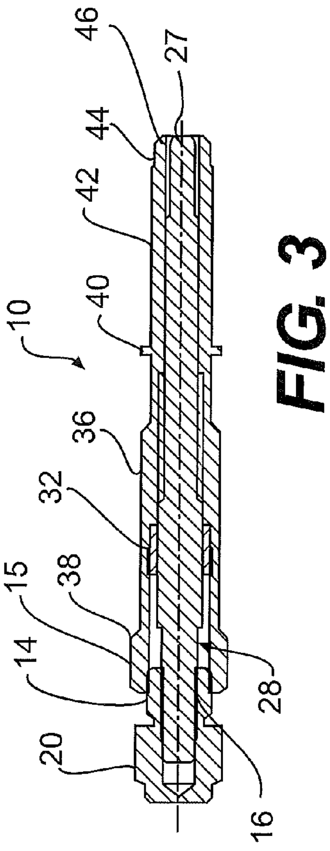
FIG. 3 is a cross-sectional view of the injector nozzle sleeve replacer shown in FIG. 1.

FIGS. 1-3 illustrate an injector nozzle sleeve replacer 10 in accordance with some embodiments of the invention. FIG. 1 is a perspective view of the injector nozzle sleeve replacer 10. FIG. 2 is an exploded view of the injector nozzle sleeve replacer 10 and FIG. 3 is a cross-sectional view of the injector nozzle sleeve replacer 10. As shown in FIGS. 1-3, the injector nozzle sleeve replacer 10 includes an external nut 12. The external nut 12 has external threads 14 and internal threads 16 located in a hole 18 of the external nut 12. The external nut 12 also includes an external hex drive 20 having several flats dimensioned to correspond to standard hex tools.

The injector nozzle sleeve replacer 10 also includes an installer screw 22. The installer screw 22 has a driving end 24 and a pushing end 26. The driving end 24 is configured to be driven by actuation of the external nut 12 to move the pushing end 26. The pushing end 26 has a rounded head 27. The rounded head 27 maybe hemispherically shaped or may have a similar shape to correspond with an internal portion of known nozzle sleeves.

The installer screw 22 at the driving end 24 has external threads 28. The external threads 28 are configured and dimensioned to interact with the internal threads 16 located in the hole 18 of the external nut 12. The installer screw 22 also has hex flats 30. The hex flats 30 are configured to interact with the hex nut 32. The hex nut 32 has an hex shaped hole 34 which locks the installer screw 22 with the hex nut 32 inside of the guide 36. When the hex nut 32 is installed into the guide 36, it is locked in place and therefore the hex nut 32 blocks the installer screw 22 from rotating. However, the installer screw 22 can still move axially with respect to the hex nut 32.

The guide 36 includes a neck portion 37 at a mid portion of the guide 36. At an upper portion of the guide 36, the guide 36 includes hex flats 38 which constitutes a external hex drive. The guide 36 also includes a stop flange 40 and a pushing portion 42. At the end of the pushing portion 42 is a reduced diameter portion 44. The reduced diameter portion 44 is dimensioned to fit into a sleeve 48. The end of the reduced diameter portion 44 may have a champered end 46.

Figure 4:
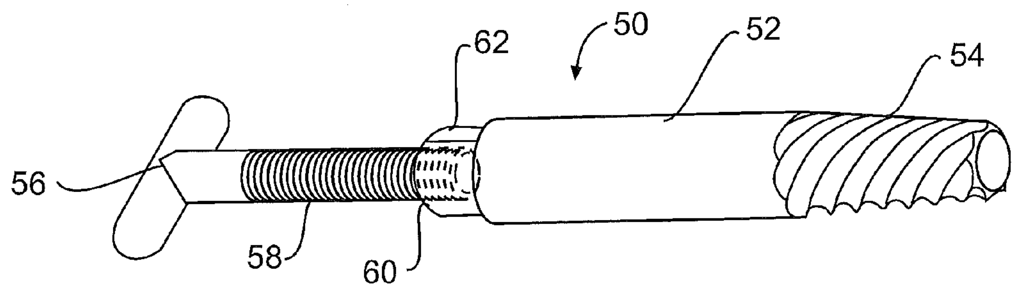
FIG. 4 is a perspective view of a tool used to remove a fuel injector nozzle sleeve from an engine part.

FIG. 4 is a perspective view of a removing tool 50. The removing tool 50 is used to remove an old fuel injector sleeve 48 from the engine block so that a new fuel injector sleeve 48 can be inserted into the engine block. The removing tool 50 is described in great detail in co-pending application Ser. No. 12/837,678 which is incorporated by reference in its entirety. The removing tool 50 includes a shank 52. At one end of the shank 52 is a tapered gripping surface 54.

A tee handle 56 is configured to screw into the shank 52. A tee handle 56 has external threads 58 which can go into a hole 60 in the shank 54 and communicate with internal threads into hole 60. The tool 50 is twisted into a fuel injector nozzle sleeve such that the tapered gripping surface 54 grips the interior of a fuel injector nozzle sleeve and a user made pull on the tee handle 56 to remove the fuel injector nozzle sleeve.

As shown in FIG. 4 in some embodiments, the removing tool 50 includes external hex drive 62 on the shank 52.

Figure 5:
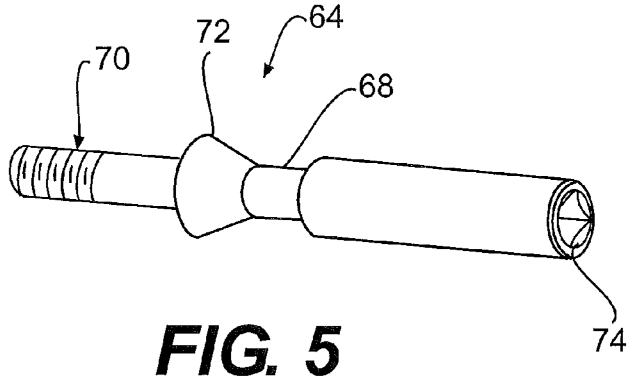
FIG. 5 is a perspective view of a clamping screw used in a system to clamp the fuel injector nozzle sleeve replacer.
Figure 6:
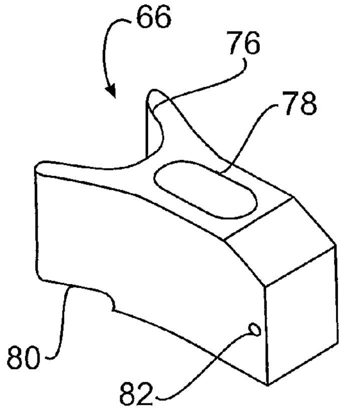
FIG. 6 is a perspective view of a clamp used with the clamping screw shown in FIG. 5 to clamp down the fuel injector nozzle sleeve replacer.

FIG. 5 and FIG. 6. show a clamping assembly for clamping the fuel injector nozzle sleeve replacer 10 shown in FIGS. 1-3 to an engine block shown in FIG. 8 that will be discussed in more detail further below. FIG. 5 illustrates a clamping screw 64. The clamping screw 64 has a shaft 68. One end of the shaft 68 has external threads 70 configured to screw into a hole in an engine block 88. (See for example FIG. 8).

A flange 72 is mounted the shaft 68 as shown. On the opposite end of the shaft 68 of the external screw threads 70 is an internal drive 74. While the internal drive 74 is shown to be a four-sided internal drive in another embodiment of the invention, other features for allowing the clamping screw 64 to be turned by a tool maybe used such as an external drive or any other type of feature maybe used in accordance with the invention.

FIG. 6 illustrates a clamp 66. The clamp 66 has on one end a "Y" shaped grip 76. A slot 78 extending through the clamp 66. The clamp 66 further includes a flange release section 80 located below the "Y" shaped grip 76. Some embodiments of the invention may also include a hole 82 to connect to a holding wire 84 showing FIG. 7.

Figure 7:
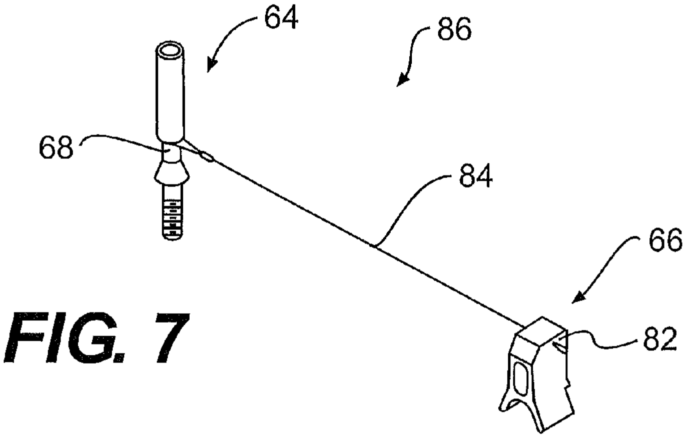
FIG. 7 is a perspective view of the clamping screw shown in FIG. 5 and clamp shown in FIG. 6 connected together with a wire.

FIG. 7 illustrates an embodiment where the clamping screw 64 and the clamp 66 are connected together by a holding wire 84 in order to reduce the likelihood of losing view of the clamp 66 or the clamping screw 64. Thus, the holding wire 84, the clamp 66, and the clamping screw 64 constitutes a clamping assembly 86. As shown in FIG. 7, the holding wire 84 attaches to the clamping screw 64 around the shaft 68 and extends through a hole 82 in the clamp 66. However, in other embodiments the clamping assembly 86 maybe kept together in a different ways. In other embodiments the clamping screw 64 and the clamp 66 may not be linked together at all.

Figure 8:
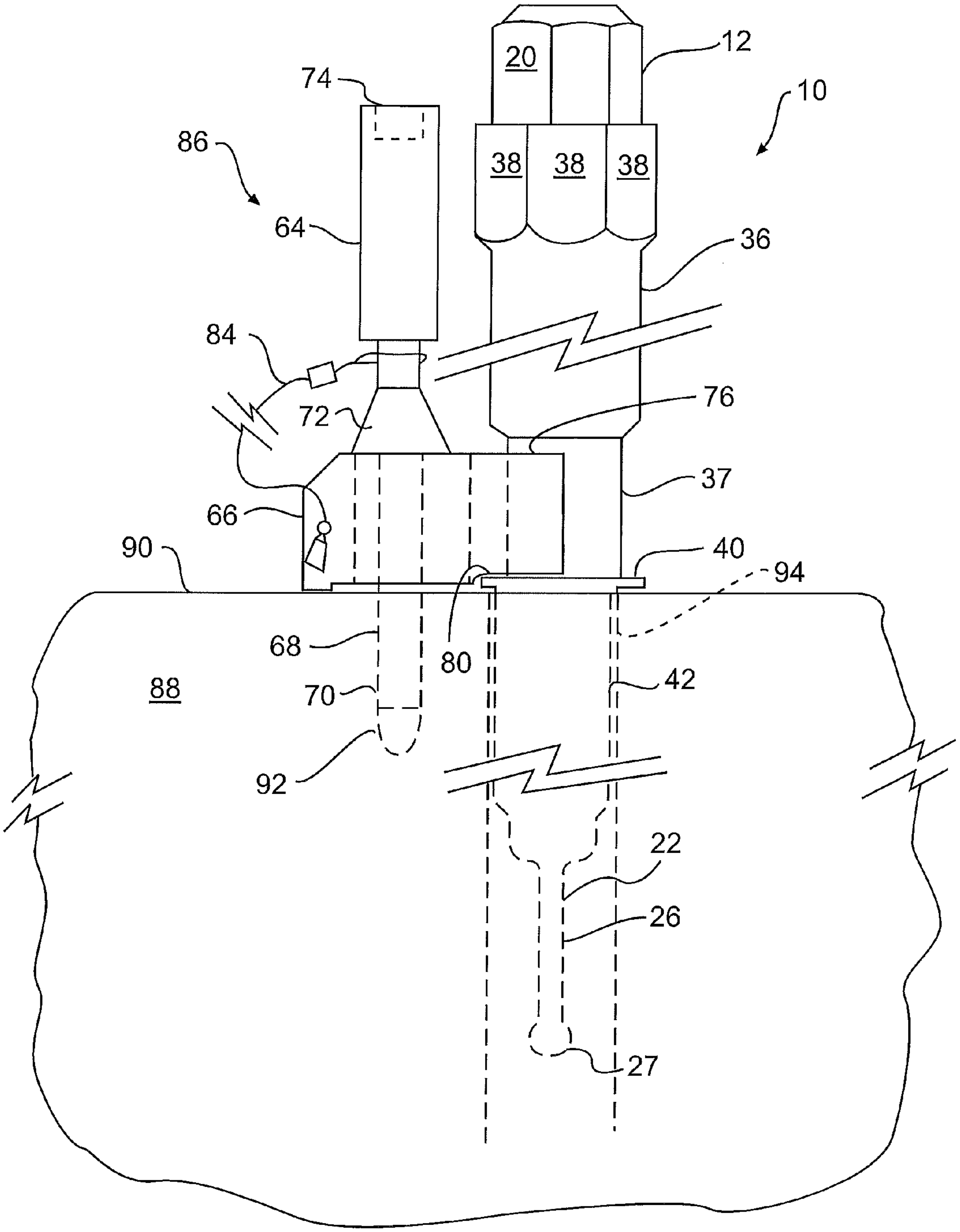
FIG. 8 is a partial view of engine block where the injector nozzle sleeve replacer is in the process of replacing an injector nozzle sleeve and is clamped down by the clamp assembly in accordance with the embodiment of the invention.

FIG. 8 illustrates the clamping assembly 86 clamping the injector nozzle sleeve replacer 10 located in an engine block 88. A clamping screw 64 is screwed into a threaded hole 92 in the engine block 88. In some of the embodiments of the invention the internal drive 74 maybe used to turn the clamping screw 64 into the engine block 88.

The flange 72 is pressing against the clamp 66. The "Y" shaped grip 76 of the clamp 66 is fit into the neck portion 37 of the injector nozzle sleeve replacer 10. The flange 40 on the injector nozzle sleeve replacer 10 fits against the top surface 90 of the engine block 88 and fits into the flange relief section 80 of the clamp 66. By virtue of the clamping screw 64, holding the clamp 66 down against the top surface 90 of the engine block 88, by way of the flange 72, the injector nozzle sleeve replacer 10 is blocked from moving out of the engine block 88.

The shaft 68 of the clamping screw 64 has the external threads 70 engaged with internal threads within the thread hole 92 in the engine block 88. A sleeve 48 (shown in FIG. 2) is fitted onto the reduced diameter portion 44 of the pushing portion 42 of the guide 36. The sleeve 48 is placed into the hole 94 in the engine block 88 where the injector nozzle sleeve 48 is to reside.

The injector nozzle sleeve replacer 10 and the fuel injector nozzle sleeve 48 are placed into the hole 94 in the engine block 88 until the stop flange 40 contacts the top surface 90 of the engine block 88. The clamp assembly 86 may be screwed into the threaded hole 92 and the engine block 88 at the same time the injector nozzle sleeve replacer and the injector nozzle sleeve 48 are placed into the engine block 88. In other embodiments, the clamp assembly 86 and the replacer 10 may be inserted at separate times.

The "Y" shaped grip 76 is fitted into the neck portion 37 of the injector nozzle sleeve replacer and the clamping screw 64 is tightened to the engine block 88. In some embodiments of the invention, the guide 36 is kept from rotating by a tool being placed over the hex flats 38 while a second tool engages the hex drive 20 of the external nut 12. While the external nut 12 is rotated with respect to the guide 36, the external nut 12 will move axially with respect to the guide 36. When the external nut 12 is tightened, the external nut 12 will move toward the guide 36. When the external nut 12 is loosened, the external nut 12 will move axially away from the guide 36. Causing the external nut 12 and the guide 36 to rotate with respect to each other will cause the installer screw 22 to move axially through the hollow portion of the guide 36.

As shown in FIG. 1 and FIG. 2, the installing screw 22 is shown to be contained within the guide 36. However, as shown in FIG. 8, the installer screw 22 is extended outside of the guide 36 such that the pushing end and the ground head 27 are exposed and are pushing against the fuel injector nozzle sleeve 48 to set it in position.

As shown in FIG. 8, the external nut 12 has been tightened all the way so that the external nut 12 pressed against the guide 36. As such, the installer screw 22 is extended to a maximum position outside of the guide 36. In some of the embodiments mentioned and as noted in FIG. 2, the two sets of threads 14, 15 and 16, 28 have opposite pitch with respect to each other. In other words, one set of threads are right-hand threads and the other set are left-hand threads. As the external nut 12 is turned, the axial movement of the external nut 12 with respect to the guide 36 is different than the rate of axial movement of the installer screw 22 through the hollow portion of the guide 36.

In some embodiments, the pitch of the threads 14, 15, and 16, 28 are selected so that axial movement of the external nut 12 with respect to the guide 36 of one unit causes axial movement of the installer screw 22 to move two units. In other words, the axial movement of the installer screw 22 is twice as fast as the rate of the axial movement of the external nut 12 with respect to the guide 36. In other embodiments of the invention, the relative rates of movements maybe modified or selected for individual applications. Furthermore, the selection of which set of threads are right-hand threads or left-hand threads maybe made or switched according to a desired result in a particular application. In some embodiments where it is not desired to have the rate of axial movement of the installer screw 22 to be different than the rate axial movement of the external nut 12 when one of the sets of threads maybe eliminated.

In any event, as shown in FIG. 8, rotational movement of the external nut 12 with respect to the guide 36 will cause the installer screw 22 to urge against the fuel injector nozzle sleeve 44 and seat the fuel injector nozzle sleeve 44 in a press fit matter into the hole 94 in the engine block 88. Further movement of the installer screw 22 will cause the rounded head 27 to swage injector 48 (see FIG. 2) in place creating an air tight seal between the injector 48 and the engine 88. Thus, the rounded head 27 will swage or upset the end of the injector 48 cone in place after the injector 48 is installed in the engine 88.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An injection nozzle sleeve servicing system comprising:

a guide having first and second ends and an interior chamber, the guide having threads on the first end;

an installer screw dimensioned to fit inside the interior chamber, the installer screw having a threaded end and a pushing end;

an external nut having first and second threads, wherein the first and second threads on the external nut are threaded in different directions, and wherein the first thread on the external nut is configured to communicate with the threads on the guide and the second thread on the external nut is configured to communicate with the threads on the installer screw; and a rotational lock in the guide configured to prevent the installer screw from rotating with respect to the guide, wherein when the first thread on the external nut is engaged with the threads on the guide and the second thread on the external nut is engaged with the threads on the installer screw, and the external nut is turned with respect to the guide and the installer screw to cause relative axial movement between the external nut and the guide, the installer screw moves axially with respect to the guide at a different rate than the axial movement of the external nut and the guide.

2. The system of claim 1, further comprising: a rounded end on the pushing end of the installer screw.

3. The system of claim 2, wherein the rounded end is a hemisphere.

4. The system of claim 1, further comprising an external drive on the guide and the external nut, the external drives configured to be engaged by a turning tool.

5. The system of claim 4, wherein the external drives are hex drives.

6. The system of claim 4, further comprising a flange on an external shaft portion of the external drives, the flange having a larger diameter than the external shaft portion of the drives located immediate on either side of the flange.

7. The system of claim 6, further comprising a clamping region on the guide between the flange and a larger diameter region.

8. The system of claim 7, wherein the larger diameter region has a diameter about the same as the flange.

9. The system of claim 1, wherein the dimensions of the threads on the external nut are such that when the external nut is turned with respect to the guide, a rate of axial movement of the installer screw with respect to the guide is double a rate of axial movement of the external nut with respect to the guide.

10. The system of claim 1, further comprising a sleeve removing device.

11. The system of claim 1, further comprising a clamp down device.

12. The system of claim 11, further comprising a retaining cable connecting parts of the clamp down device together.

13. The system of claim 11, wherein the clamp down device is dimensioned to engage a clamping area and flange of the guide.

14. The system of claim 1, wherein the guide has a reduced diameter end dimensioned to fit into a fuel injector sleeve.

15. The system of claim 1, wherein the rotational lock includes a nut having a hex shaped hole fit around and locked with a hex portion of the installer screw.

16. An injection nozzle sleeve servicing system comprising:

means for guiding having first and second ends and an interior chamber, the means for guiding having threads on the first end;

means for pushing dimensioned to fit inside the interior chamber, the means for pushing having a threaded end and a pushing end;

an external nut having first and second threads, wherein the first and second threads on the external nut are threaded in different directions, and wherein the first thread on the external nut is configured to communicate with the threads on the means for guiding and second thread on the external nut is configured to communicate with the threads on the means for pushing; and means for rotational locking in the means for guiding configured to prevent the means for pushing from rotating with respect to the means for guiding, wherein when the first thread on the external nut is engaged with the threads on the means for guiding and the second thread on the external nut is engaged with the threads on the means for pushing, and the external nut is turned with respect to the means for guiding and the means for pushing to cause relative axial movement between the external nut and the means for guiding, the means for pushing moves axially with respect to the means for guiding at a different rate than the axial movement of the external nut and the means for guiding.

* * * * *